US009494674B2

(12) United States Patent
Messier et al.

(10) Patent No.: US 9,494,674 B2
(45) Date of Patent: Nov. 15, 2016

(54) PERSONAL LOCATOR BEACON SYSTEM

(71) Applicant: ILOC TECHNOLOGIES INC., Pointe-Claire (CA)

(72) Inventors: Yves Messier, Pierrefonds (CA); Laura Watkins, Pierrefonds (CA); Jerome Baron, Laval (CA); Sylvain Ainsley, St-Eustache (CA); Ron Toledano, Dollard-des-Ormeaux (CA); Aravind Radhakrishna Warrier, Montreal (CA)

(73) Assignee: SAFETRACKS GPS CANADA INC., Red Deer, AB (CA)

(*) Notice: Subject to any disclaimer, the term of this patent is extended or adjusted under 35 U.S.C. 154(b) by 0 days.

(21) Appl. No.: 14/633,656

(22) Filed: Feb. 27, 2015

(65) Prior Publication Data

US 2015/0247913 A1  Sep. 3, 2015

Related U.S. Application Data

(60) Provisional application No. 61/947,029, filed on Mar. 3, 2014.

(51) Int. Cl.
*G08B 1/08* (2006.01)
*G01S 5/00* (2006.01)
*G01S 19/48* (2010.01)

(52) U.S. Cl.
CPC .............. *G01S 5/0027* (2013.01); *G01S 19/48* (2013.01)

(58) Field of Classification Search
CPC .............................. G01S 5/0027; G01S 19/48
USPC ...................................................... 340/539.13
See application file for complete search history.

(56) References Cited

U.S. PATENT DOCUMENTS

| 7,492,251 | B1 | 2/2009 | Katz |
| 7,825,794 | B2 | 11/2010 | Janetis et al. |
| 2005/0017901 | A1 | 1/2005 | Koptiev |

FOREIGN PATENT DOCUMENTS

EP            1304671 B1      3/2006

*Primary Examiner* — Eric M Blount
(74) *Attorney, Agent, or Firm* — Anglehart et al.

(57) ABSTRACT

A personal locator beacon system including at least one individual locator device and a plurality of battery powered wireless beacons installed at different locations within a facility. Each individual locator device is worn by a corresponding individual and has a local wireless transceiver and a GPS receiver. The plurality of beacons include at least a subset of reed switch beacons installed at different doorway locations within the facility. Each reed switch beacon is configured to transmit an identification signal with a predetermined signal strength for reception by the local wireless transceiver of the individual locator device within a designated area of the facility, as well as to selectively acquire a perimeter mode for detecting opening of a respective door of the facility.

9 Claims, 16 Drawing Sheets

External housing    Electronics board    Back housing    Fasteners

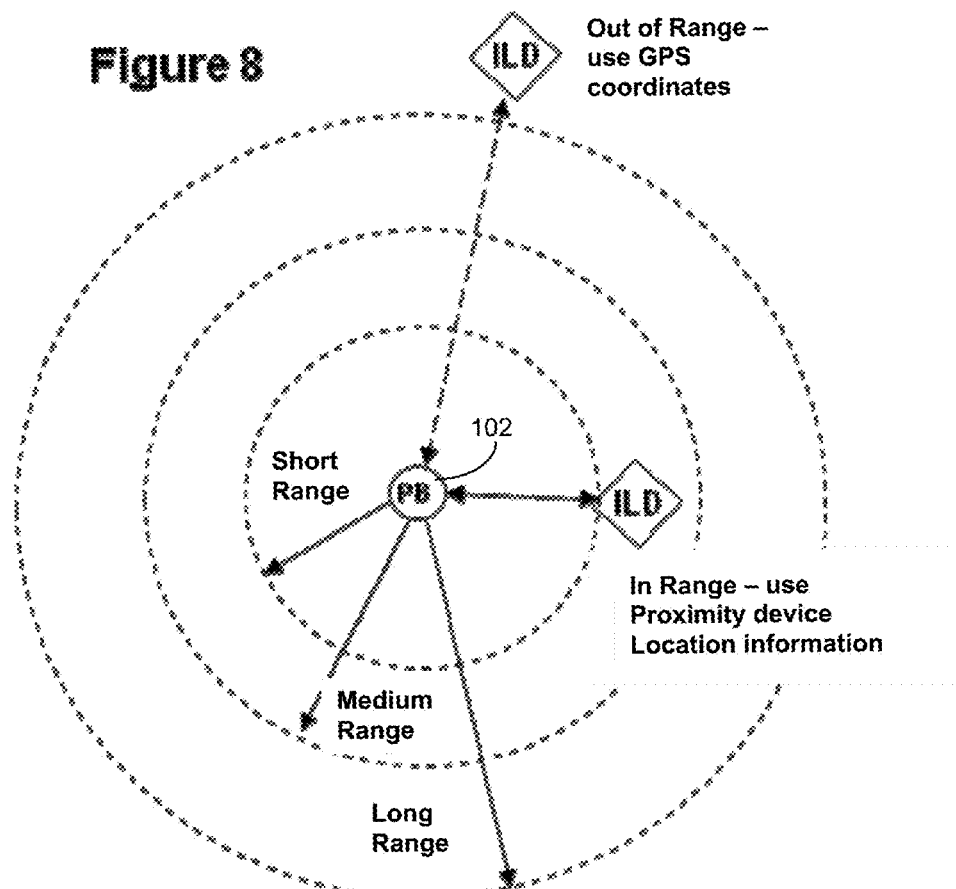

Figure 14

PERSONAL LOCATOR BEACON SYSTEM

CROSS-REFERENCE TO RELATED APPLICATION

The present application claims priority of U.S. provisional application Ser. No. 61/947,029, filed Mar. 3, 2014 and hereby incorporated by reference.

TECHNICAL FIELD

The present invention relates generally to the field of personal location systems and, more specifically, to a personal locator beacon system for geolocating an individual with respect to a perimeter.

BACKGROUND

In a variety of fields, there is a growing need for systems and devices (also referred to as personal location systems or personal emergency response systems) that can monitor and/or track the location of an individual or an object. For example, such monitoring is useful in the medical care and assisted living fields, in order to ensure the safety and security of patients (e.g. individuals with autism or Alzheimer's) who may wander outside of a care facility and potentially become lost. Other potential fields include child care, law enforcement and geographically isolated working environments (e.g. mines).

Prior art personal location systems rely mainly on GPS (Global Positioning System) technology, which cannot typically provide indoor location data since GPS is a space-based satellite navigation system that requires an unobstructed line of sight to several GPS satellites in order to provide location information.

Existing personal location systems that provide indoor locating typically rely on complex mesh networks or Wi-Fi and have very high deployment costs. Such systems are not easily scalable for residential-type establishments and require a high level of technical expertise for installation and setup.

Other solutions for indoor locating services make use of a single base station set up within a perimeter (e.g. a building), that can detect when a location device is in or out of communication range. Unfortunately, such prior art solutions cannot identify the specific area (e.g. room) in which the individual is located within the monitored perimeter.

U.S. Pat. No. 7,825,794 describes a patient tracking system in which the patient wears an electronic asset tag having an active mode and a sleep mode. The electronic tag is kept at low power in the sleep mode to conserve power, and power is consumed by the electronic tag when the electronic tag moves out of range of an external transmitter. When the patient moves out of range of a base station for a predetermined period of time, the electronic tag switches on and begins transmitting its coordinates to a terrestrial radio network. The non-portable base station is described as being positioned at a fixed location and powered from the mains. Unfortunately, this system would likely fail during a power outage or power glitch, conditions which would seem to raise false alarms disabling power mode. Furthermore, this system does not provide for any alarm events when the electronic tag has gone beyond the range of the plugged-in base station, nor is this system able to identify a specific area in which the patient is located.

Consequently, there exists a need in the industry for an improved personal location system.

SUMMARY

In a broad aspect, the present invention provides a personal locator beacon system comprising: at least one individual locator device worn by at least one corresponding individual, the locator device having a local wireless transceiver and a GPS receiver; a plurality of battery powered wireless beacons installed at different locations within a facility, the plurality of beacons including at least a subset of reed switch beacons installed at different doorway locations within the facility, each reed switch beacon configured to: transmit an identification signal with a predetermined signal strength for reception by the local wireless transceiver of the at least one individual locator device within a designated room or area associated with the facility; selectively acquire a perimeter mode for detecting opening of a respective door of the facility; if in the perimeter mode, provide an alert signal for reception by a particular individual locator device when the particular individual locator device is in communications range and a status of the respective reed switch is changed.

In another broad aspect, the present invention provides a computer readable storage medium storing a program element suitable for execution by a CPU, the program element implementing a graphical user interface module for displaying beacon setup information, the graphical user interface module being adapted for: in a first viewing window, displaying controls representative of connectable beacons, each control allowing a user to select a respective connectable beacon; in a second viewing window, displaying status information associated with a selected beacon; in a third viewing window, displaying at least one control allowing a user to set at least one parameter of a selected beacon; displaying a control allowing a user to save set parameters of a selected beacon.

In another broad aspect, the present invention provides an apparatus for implementing a user interface for displaying beacon setup information, the apparatus comprising: an input for receiving a beacon access signal; a processing unit coupled to said input, the processing unit being operative to scan for connectable beacons within a predefined range of the apparatus and implement a graphical user interface module for displaying beacon setup information, the graphical user interface module being adapted for, in a first viewing window, displaying controls representative of connectable beacons detected by the scan, each control allowing a user to select a respective connectable beacon, in a second viewing window, displaying status information associated with a selected beacon, in a third viewing window, displaying at least one control allowing a user to set at least one parameter of a selected beacon, and displaying a control allowing a user to save set parameters of a selected beacon; an output coupled to the processing unit, the output being suitable for releasing a signal for causing a display unit to display the graphical user interface module.

In yet another broad aspect, the present invention provides a method for displaying beacon setup information on a display of a mobile computing apparatus, the method comprising: receiving a beacon access signal at the mobile computing apparatus; scanning by the mobile computing apparatus for connectable beacons within a predefined range; displaying, in a first viewing window presented on a display screen of the mobile computing apparatus, controls representative of connectable beacons, each control allowing a user to select a respective connectable beacon; displaying, in a second viewing window presented on the display screen of the mobile computing apparatus, status information associated with a selected beacon; displaying, in a third viewing window presented on the display screen of the mobile computing apparatus, at least one control allowing a user to set at least one parameter of a selected beacon; providing a control allowing a user to save set parameters of a selected beacon.

In a further broad aspect, the present invention provides a personal locator beacon system comprising: at least one individual locator device worn by at least one corresponding individual, the locator device having a local wireless transceiver and a GPS receiver; a plurality of battery powered wireless beacons installed at different locations within a facility, the plurality of beacons including at least a subset of reed switch beacons installed at different doorway locations within the facility, each reed switch beacon configured to transmit an identification signal with a predetermined signal strength for reception by the local wireless transceiver of the at least one individual locator within a designated room or area associated with the facility, provide at least one of a contact and a digital output signal when at least one particular individual locator is in communications range and a status of the respective reed switch status is changed; an apparatus for implementing a user interface for displaying beacon setup information, the apparatus comprising an input for receiving a beacon access signal, a processing unit coupled to the input, the processing unit being operative to scan for connectable beacons within a predefined range of the apparatus and implement a graphical user interface module for displaying beacon setup information, the graphical user interface module being adapted for in a first viewing window, displaying controls representative of connectable beacons detected by the scan, each control allowing a user to select a respective connectable beacon, in a second viewing window, displaying status information associated with a selected beacon, in a third viewing window, displaying at least one control allowing a user to set at least one parameter of a selected beacon; displaying a control allowing a user to save set parameters of a selected beacon; an output coupled to the processing unit, the output being suitable for releasing a signal for causing a display unit to display the graphical user interface module; a display unit coupled to the output of the apparatus, the display unit being responsive to the signal to display the graphical user interface module; a remote server receiving alert messages and location data from the at least one individual locator device, and beacon setup data from the apparatus, the server storing the received location and beacon setup data.

BRIEF DESCRIPTION OF THE DRAWINGS

The invention will be better understood by way of the following detailed description of embodiments of the invention with reference to the appended drawings, in which:

FIG. 8 is a schematic diagram illustrating wireless communication range selection between the beacon and the individual locator device, in accordance with an embodiment of the present invention;

FIGS. 12-14 illustrate sample viewing windows of an Internet-based user portal allowing authorized system users to view location data and alerts, as well as to set up various modes of operations of the beacons and individual locator devices of the personal locator beacon system, in accordance with an embodiment of the present invention;

DETAILED DESCRIPTION

Figure 1:
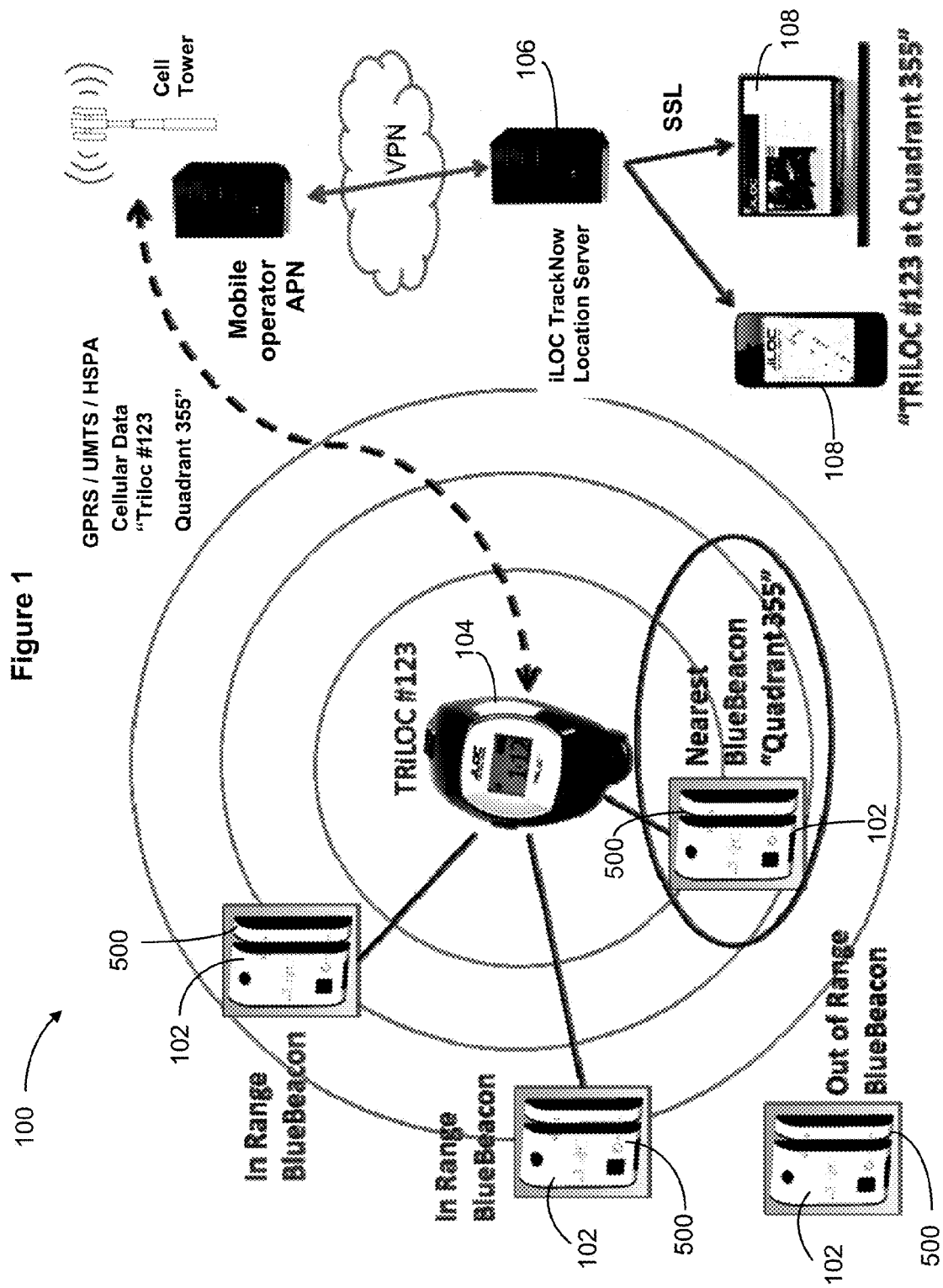
FIG. 1 is a schematic diagram illustrating a personal locator beacon system, according to an embodiment of the present invention.

The present invention relates to a personal locator beacon system, in which a plurality of low power, self-contained, wireless (communication) beacons are installed at different locations of a facility, such as to define a perimeter. Each beacon is configured to transmit an identification signal with a predetermined signal strength. At least one individual locator device, having a local wireless transceiver and a GPS receiver, is worn by a corresponding individual and can search for the existence of one or more beacons within radio frequency range of the locator device. The local wireless transceiver of the locator device is operative to receive the identification signal broadcast by a particular beacon when within radio frequency range of the particular beacon (i.e. within a designated room or area of the facility that is associated with the particular beacon). The system also includes a remote computing device (e.g. server, computer, laptop, etc.) operative to store location data (e.g. in the form of beacon identification data) received from the at least one locator device, the remote computing device capable to process this location data to track the corresponding individual and, when necessary, to communicate tracking and/or alert information to a third party (e.g. a monitoring station or a care giver).

When outside the perimeter, the individual locator device selectively turns on a cellular and/or a GPS receiver to determine the geolocation thereof. An alarm can be triggered, and an alarm message sent to the remote computing device when no beacon signal is received, where the remote computing device may be operative to forward this alarm message to a third party, such as a care giver monitoring station. In addition to the alarm message, the locator device may transmit the resolved cellular or GPS-based location data to the remote computing device, in order to reduce the possibility of the corresponding individual getting lost.

Note that, for the purposes of the present description, the term "beacon" implies a radio transmitter emitting signals to identify a location.

Also note that the facility can be an indoor facility, an outdoor facility or a combination of both, as can be the perimeter defined by the beacons. Examples of such a facility include, but are not limited to, a house, a hospital, a medical care facility, an assisted living facility, a garden, an apartment building, a commercial building, a work site, an underground parking garage and a mining facility, among many other possibilities.

A perimeter can be defined using one or several beacons installed at different facility locations between which the individual wearing the individual locator device is allowed to move. The present invention is not limited to "inside the perimeter" being understood as within a closed geometrical locus. For the purposes of this description, "inside the perimeter" corresponds to an alarm stand-down state of the individual locator device. For example, for the purposes of enforcing a restraining order, in which a monitored person is not allowed to approach a building or a person, "inside the perimeter" is understood as the open geometrical locus outside the building or far from the person, while "outside the perimeter" is understood as the closed space within the building or too close to the person.

A perimeter can also be defined by the clear signal range of a single beacon. Again, "inside" and "outside" the perimeter respectively correspond to "allowed" and "disallowed" beacon clear signal transmission ranges.

As mentioned above, perimeter monitoring by the beacons is provided using very low power. In a specific, non-limiting example of implementation, the beacons employ low-power communication devices, such as Bluetooth version 4.x transceivers, which may contain a simple microcontroller to store and communicate location data. Specific to the present invention, the identification (e.g. location) data stored in the low-power communication device of a beacon can be easily programmed by an end user using a computing device (e.g. smart phone, tablet, notebook, portable computer, etc.), as will be discussed in further detail below.

In the case of Bluetooth 4.x transceivers, the latter can double as short range communications transceivers exchanging signals and information with at least one sensor module configured to obtain at least one sensor value concerning the well being of the monitored individual. This exchange of signals and information can be conducted within a Personal Area Network (PAN).

Note that, in the context of the present description, the term "Bluetooth 4.x" implies any one of the Bluetooth wireless communications protocol versions that have been released since Bluetooth 4.0 (including 4.0, 4.1 and 4.2), as well as subsequent updated versions that may eventually be released.

Note also that different types of low-power, wireless communication protocols, besides Bluetooth 4.x, may be employed by the beacons of the personal locator beacon system without departing from the scope of the present invention.

Figure 2:
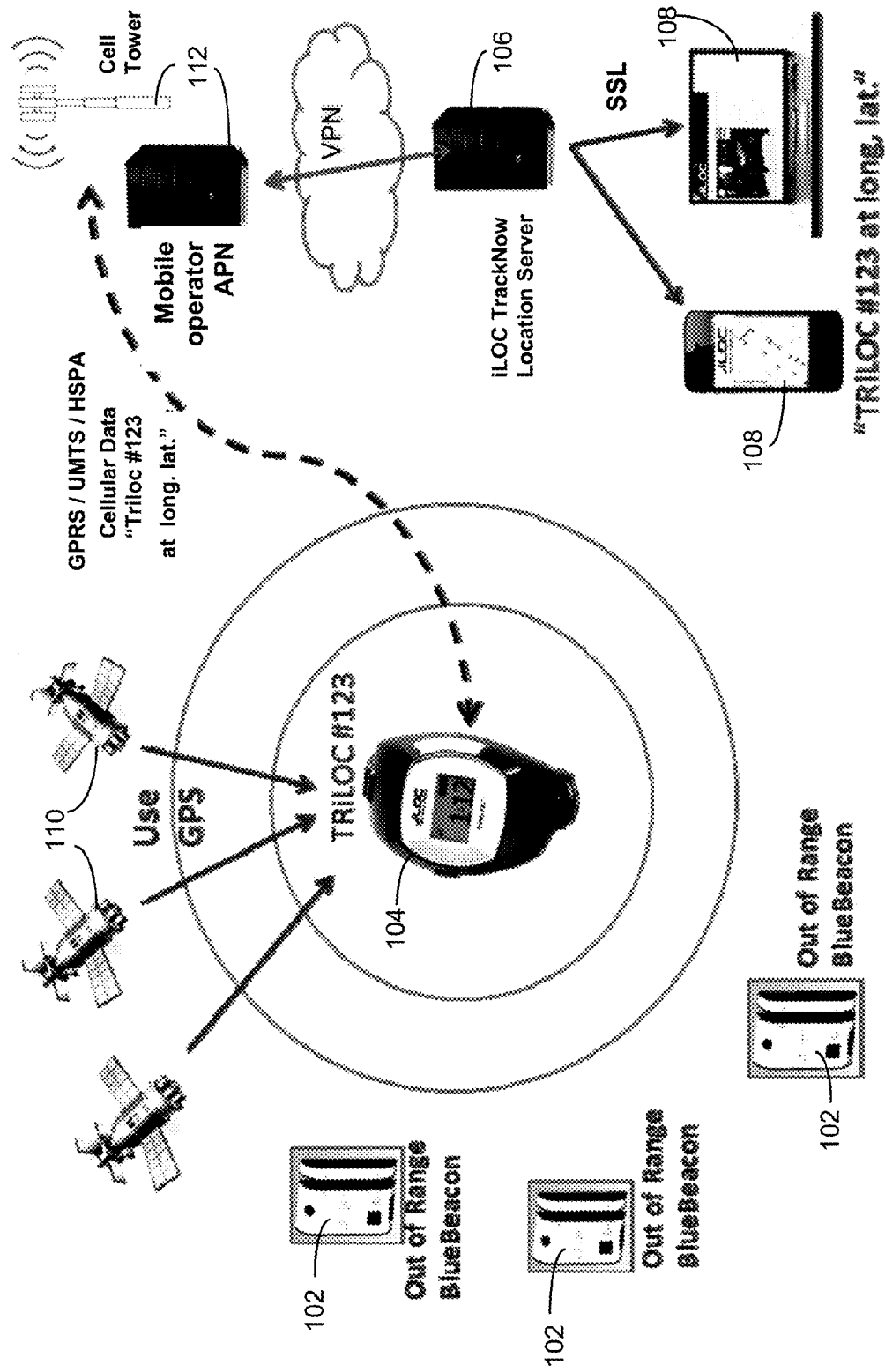
FIG. 2 is a schematic diagram illustrating the personal locator beacon system using GPS to acquire geolocation data, in accordance with a non-limiting example of implementation of the present invention.

In accordance with a non-limiting example of implementation of an embodiment of the present invention, a personal locator beacon system 100 is illustrated in FIGS. 1 and 2. The system 100 includes a plurality of beacons 102, an individual locator device 104, a locator messaging server 106 and caregiver monitoring units 108. In the example illustrated in FIG. 1, the individual locator device 104 is in data communications range of at least one beacon 102, such that location data can be acquired from the at least one beacon 102 for forwarding to the locator messaging server 106. In the example illustrated in FIG. 2, the individual locator device 104 is out of range of data communication with any of the beacons 102, and as such acquires geolocation data using the Global Positioning Satellite (GPS) network 110, for forwarding to the locator messaging server 106.

The individual locator device 104 acts as a master component with respect to communications and data relay to the locator messaging server 106, which selectively or automatically communicates with the caregiver monitoring units 108. From a communications point of view, the individual locator device 104 is configured to interface wirelessly with compatible communication devices, including the aforementioned beacons 102. When the individual locator device 104 and one of the beacons 102 are within a transmit distance, communications are established in accordance with the particular beacon's ID, wherein the particular beacon 102 is a slave component with respect to such established communications. Communications slave components can communicate location information to the individual locator device 104 (the individual locator device 104 subsequently passes this information to server 106 and care givers 108) and/or activate or deactivate other monitoring and security related functions.

The individual locator device 104 obtains and communicates geolocation information periodically to the locator messaging server 106 according to pre-defined individual locator device configuration parameters, on request from care givers and/or monitoring service(s)/station(s), or event driven whenever an alert condition occurs. Geolocation information can be retrieved either from the closest beacon device 102, GPS network 110 or the public cellular network (Assisted-GPS) 112 (as seen in FIG. 2). Geolocation and alert information is communicated to the locator messaging server 106 via a public cellular network 112 (e.g. using General Packet Radio Service (GPRS), Universal Mobile Telecommunications System (UTMS), High Speed Packet Access (HSPA), etc.) for data storage and relay to care givers and/or other alarm monitoring services by using electronic communication methods.

Additionally, every time a successful connection is established between the individual locator device 104 and the location messaging server 106, the locator device 104 may communicate a power status (e.g. battery level) of the respective beacon 102 to the location messaging server 106 for storage along with the location data. As such, system users will have access to an up-to-date power status for beacons 102 of the personal locator beacon system 100.

The location messaging server 104 implements a central storage (e.g. database) for storing at least one of identification, location and status data (e.g. power status) relative to some or all of the beacons 102 of the personal locator beacon system 100, as well as similar information for the individual locator devices 104 of the personal locator beacon system 100. Since all of this information is stored centrally by the location messaging server 104, it is possible to remotely access, update or modify, and retrieve any of this beacon data, either upon request to the server 106 or by regular transmission of such beacon data to the server 106 every time an individual locator device 104 communicates with the server 106.

Note that the location messaging server 106 may locally implement and maintain a database for storing all of the identification, location and status data or, alternatively, may communicate with and store all of the data in a remote database, separately implemented.

The personal locator beacon system 100 shown in FIG. 1 may include different types of beacons 102, including but not limited to: portable multifunction beacons, passive beacons, active beacons, proximity beacons, reed-switch beacons, relay devices, stand-alone electronic locking devices, motion detectors, video surveillance cameras, among other possibilities. Each of these beacon devices include a unique device type identifier. Each beacon type can implement a low-power, wireless communication protocol, such as Bluetooth 4.x communications for example, and can be assigned a textual name and/or geo-location coordinates which can be conveyed to the individual locator device to provide more precise location information when GPS geo-location is not available or of insufficient accuracy. For example, insufficient accuracy can be defined as a geo-positioning error larger than the monitored perimeter.

Note that, in the context of the present description, the term "passive" as it applies to a beacon 102 of the personal locator beacon system 100 does not infer that the beacon is not actively performing a function of some sort. Rather, even a passive beacon is continuously broadcasting its availability to be interrogated regarding its information.

In accordance with an embodiment of the proposed solution, FIGS. 3A, 3B, 3C and 4 illustrate aspects of a beacon 102 of the personal locator beacon system, the beacon 102 configured to transmit a beacon signal containing at least a passive beacon IDentification (ID). The beacon device is preferably inexpensive, easily installed using commonly available tools, small in size and fully self-contained.

In a non-limiting example of implementation, the beacon 102 is sized to fit on a door frame or windowed door, being for example less than 37 mm (1.5") in width. The casing or housing of the beacon 102 may be formed of any suitable material, including for example UV resistant case material and UL94V-0 fire rating case material.

Figure 3A:
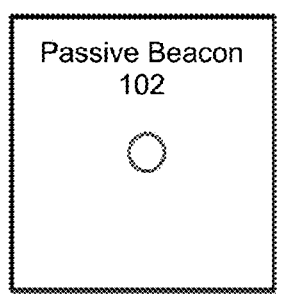
FIGS. 3A and 3B are schematic diagrams illustrating front and back views of a beacon device, in accordance with a non-limiting example of implementation of the present invention.
Figure 3B:
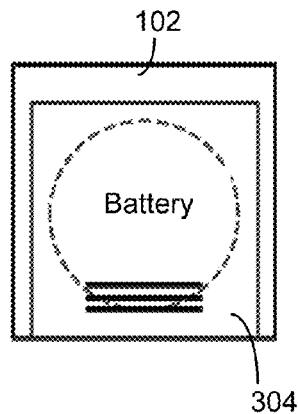
Figure 3C:
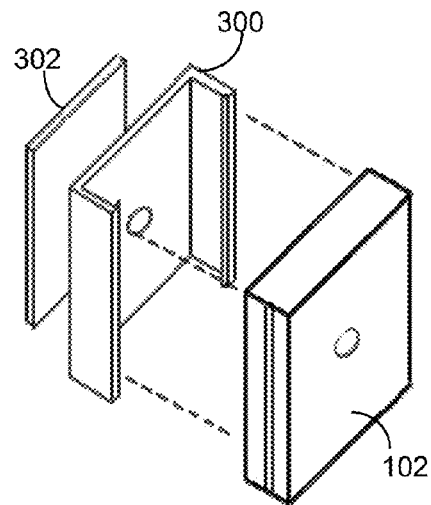
FIG. 3C is a schematic diagram illustrating an exploded view of the beacon device and anchor components, in accordance with a non-limiting example of implementation of the present invention.

FIG. 3C illustrates the example of a mounting bracket 300 and/or double-sided self-adhesive tape 302 being employed for installation of a beacon 102, where the latter is typically installed on a wall surface, ceiling surface or doorframe surface of the facility. In a specific, non-limiting example, a beacon 102 can be installed on drywall using two screws and anchor mounts, or on any surface using a double-sided, self-adhesive tape. In another example, the beacon 102 is permanently anchored to a structural object with an appropriate anchor, for example a wall anchor such as, but not limited to a rivet. Note that the beacons 102 of the personal locator beacon system 100 may be installed on a variety of other surfaces, depending on the specific application, as well as using various different types of installation mechanisms, without departing from the scope of the present invention.

In another non-limiting example of implementation, the beacon device 102 is resistant to water and other elements (e.g. dust), for installation and use both outdoors (rain, dust) and indoors where the unit may be exposed to spray washing.

In accordance with an implementation of the proposed solution, the beacon 102 provides identification and/or location information when in transmission range of the individual locator device 104. In some embodiments, the beacon 102 also transmits a device type ID. In yet other embodiments, the beacon 102 is programmable during manufacturing and/or in the field to provide a geolocation, including a fully qualified global position, address or location within a building. Employing for example Bluetooth 4.x, the beacon 102 provides both a low power beacon wireless signal within a range, as well as minimizes the number of communication components for individual monitoring system features described herein.

The transmission range of the beacon device 102 can be user selectable in the field between low, medium and long, as discussed in further detail below. With reference to FIG. 8, the beacon 102 can be programmed to transmit an RF signal at one of multiple power levels resulting in a corresponding variable wireless communication range that can be adjusted depending on deployment. While FIG. 8 illustrates setting the transmit power level to one of high, medium or low range, it is understood that transmit power can be set to other fixed or continuously variable transmit levels depending on the particular monitoring deployment.

Figure 4:
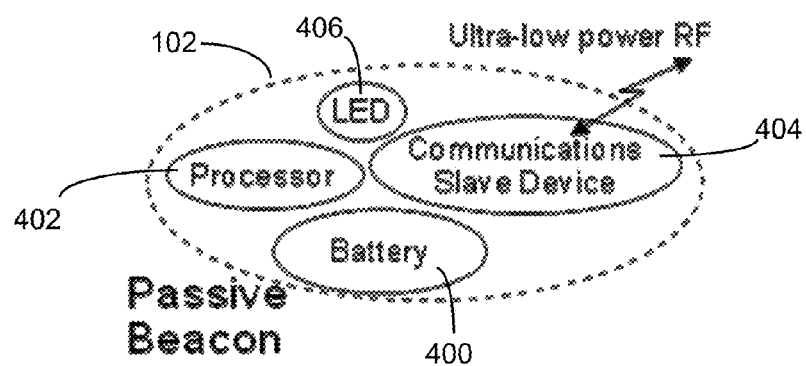
FIG. 4 is a schematic diagram illustrating functional components of the beacon device, in accordance with a non-limiting example of implementation of the present invention.

FIG. 4 illustrates a functional representation of a low power beacon 102, according to a non-limiting example of implementation of the present invention. The beacon includes a power source 400 (e.g. a battery), a processor 402 (e.g. electronic circuit board) and a communications slave device 404 (e.g. Bluetooth 4.x transmitter) operationally coupled to the power source 400.

In some implementations, the power source 400 is a user replaceable battery. Preferably, the power source 400 is a button type battery cell, either of a single use type or rechargeable type. Preferably a lithium button cell is employed, capable of providing power for multiple years of operation. Other button cell battery types may also be used such as NiCd or NiMH. Depending on implementation, batteries may need to be removed and recharged periodically using commercially available battery chargers.

With reference to FIG. 3B, the beacon unit 102 includes a battery housing or access panel or door 304 (which may be the actual cover of the beacon unit 102) that is removable using a simple tool, such as a flat head screwdriver for example, in order to allow for access to the power source 400 and, in the case of a battery, easy battery replacement. Advantageously, in the case of a battery, the battery is accessible without the beacon having to be un-mounted from the respective wall or doorframe of the facility.

In other implementations, the beacon unit 102 may also include a Light Emitting Diode (LED) 406 for indicating one or more states of the beacon unit 102, such as for example a low battery level or that the beacon is in setup mode, as shown in FIG. 4. The LED 406 may be persistently lit or periodically flashing at different intervals, to indicate different conditions of the beacon.

In yet other implementations, the beacon unit 102 may include an internal tamper switch. Such a tamper switch may be triggered by opening of the beacon enclosure, and its activation will cause the beacon unit 102 to broadcast an alert condition for capture by an individual location device 104 that is in range thereof. This alert condition will then be transmitted by the individual location device 104 to the location messaging server 106, for forwarding to a system administrator or caregiver.

In a further implementation, each beacon unit 102 also includes on its enclosure, housing, casing or cover a setup button in communication with the processor 402 of the beacon unit 102. When depressed or activated, the setup button causes the beacon unit 102 to acquire a programming mode, in which the beacon unit 102 can be programmed (i.e. settings or parameters of the beacon can be set, defined or updated) by a caregiver or user using a device compatible with the communications transceiver (e.g. Bluetooth 4.x) of the beacon unit 102, as discussed further below.

Taking the example where the beacon 102 employs Bluetooth 4.x, the Bluetooth 4.x communications transceiver of the beacon is configured as a slave Bluetooth communications component and is generally discoverable by a master Bluetooth communication component of an individual locator device 104. In accordance with one implementation, the master individual locator device 104 is configured to listen to one or more beacons 102 at a repetition rate, and read at least one of: a beacon ID, a beacon device type ID, a location ID, geolocation, a monitored individual ID, etc. In other implementations, the beacon 102 can also be configured to periodically transmit, providing at least one of: a beacon ID, a beacon device type ID, a location ID, geolocation, a monitored individual ID, etc. When exclusively providing a unique beacon ID or unique beacon device type ID, the beacon 102 need not be programmable and the beacon 102 can be set at manufacture to transmit the unique ID. The unique beacon ID can be a unique Media Access Control (MAC) address which can simplify unique beacon ID validation.

A beacon processor 402 interfaces to the wireless Bluetooth 4.x communications slave circuit 404, which is set by the processor 402 to be generally discoverable by one or more individual locator devices 104. Wireless data communication may be secured through the application of an encryption engine, for example 128-bit AES encryption can be employed.

Specific to the present invention, the beacon 102 can be programmed by a system user or care giver with location information, including at least one of: alphanumeric text (for example "Apt. 403", "bedroom", "mobile beacon installation"), GPS longitude and latitude coordinates, etc. This programmed information is communicated to an individual locator device 104 when needed. The beacon 102 can be programmed by an end user using a device compatible with the Bluetooth 4.x communications transceiver, such an end user using a device that includes a compatible wireless communications transceiver, such as a computer or smart phone. This programming of the beacons 102 will be discussed further below.

Note that, being inconspicuous and of low cost, beacon devices 102 can be installed in numerous locations of a facility, and in some implementations can be programmed with location information and set of ranges using a portable device, such as a smart phone incorporating a compatible wireless transceiver including but not limited to Bluetooth 4.x and beacon programming software.

Alternatively, rather than programming the beacon 102 itself such as to change the information stored in the beacon 102 and therefore broadcast by the beacon 102, it is possible to simply assign location information (e.g. alphanumeric text, GPS coordinates, etc.) to the unique ID (e.g. MAC address) of the beacon 102 in the central storage of the locator messaging server 106. When an individual locator device 104 is in range of a broadcasting beacon 102, and reads the unique ID of the beacon 102 (as well as optionally other status information of the beacon 102), the individual locator device 104 will transmit this unique ID (and optionally the associated status information) to the locator messaging server 106 for storage. In this example of implementation, it is at the locator messaging server 106 that location information may be assigned to each unique beacon ID, on a basis of programming by a user or caregiver for example using a user portal (e.g. website) or a mobile computing apparatus (e.g. smart phone, tablet, etc.), as discussed in further detail below. Advantageously, if the individual location device 104 need only send the unique ID to the locator messaging server 106, this reduces the amount of data to be shared between beacon 102 and individual location device 104, which also saves on power usage by the devices.

In a non-limiting embodiment of the present invention, at least a subset of the beacons 102 of the personal locator beacon system 100 are reed switch beacons 500, as shown in FIG. 1. A reed switch beacon 500 is a subtype of the passive beacon described herein, additionally including at least one reed switch internally along one side of the beacon unit, where this reed switch consists of hard electrical contacts responsive to, and/or optionally a digital output indicating, the proximity of a corresponding magnet, the reed switch beacon 500 being programmed to initiate certain actions when a status of the reed switch changes. In a specific, non-limiting example, the output (electrical or digital) of the reed switch can be used to control other devices, such as lights and/or security systems.

Figure 5:
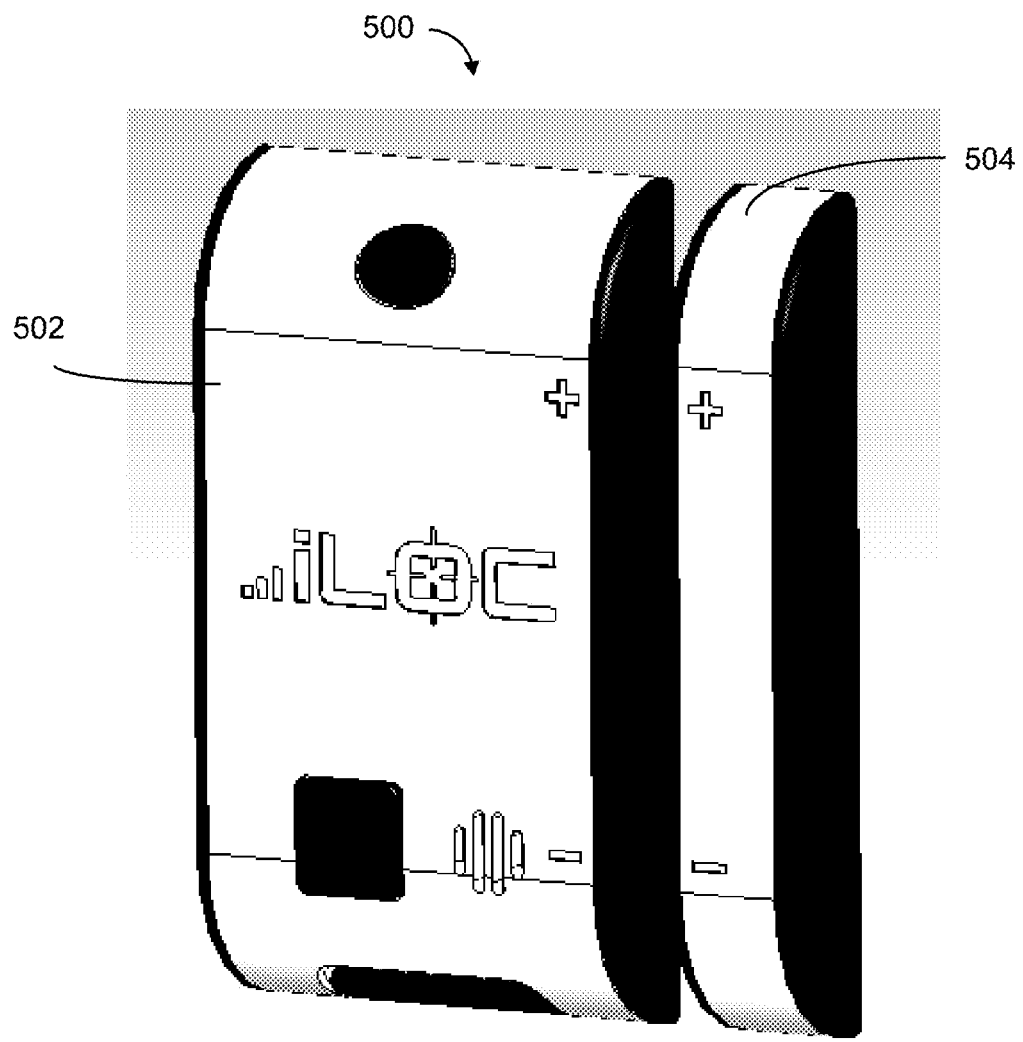
FIG. 5 is a schematic diagram illustrating a reed switch beacon device, in accordance with a non-limiting example of implementation of the present invention.

A non-limiting example of implementation of such a reed switch beacon device is shown in FIG. 5, where the reed switch beacon unit 500 includes primary 502 and secondary 504 enclosures. The primary enclosure 502 contains the reed switch and the secondary enclosure 504 contains a wide-gap magnet that applies a magnetic field when in proximity to the primary enclosure 502, this magnetic field operating the position of the electrical contacts and/or the digital output of the reed switch within the primary enclosure 502, whereby proximity or lack thereof between the primary and secondary enclosures 502, 504 determines the status of the reed switch.

In the specific example of a reed switch beacon 500 installed in a doorway location of the facility, the primary enclosure 502 of the reed switch beacon 500 may be installed on the door frame or jamb, while the secondary enclosure 504 would be installed on the door itself, or vise versa, for example both installed approximately 10-25 cm above the door handle. As such, the primary and secondary enclosures 502, 504 are adjacent and in proximity to one another (for example having a gap of 5 mm to 20 mm between the side edges of the primary 502 and secondary 504 enclosures), and thus the magnet of the secondary enclosure 504 applies its magnetic field to the primary enclosure 502, when the door is closed. However, when the door is opened, the magnet in the secondary enclosure 504 is pulled away from the primary enclosure 502, the magnetic field is reduced or removed, and the reed switch accordingly closes a contact or a digital output turns on lights or raises a security system alarm (silent or not). Without limiting the invention, the raised alarm can be used to (automatically) trigger a geolocation query (and alert) from the locator messaging server 106 or a monitoring station 108 via long distance communications (SMS/GSM). Obviously, multiple door or doorway locations of a same facility can each have a reed switch beacon 500 installed thereon.

As described above for the beacons 102 of the personal locator beacon system 100, the reed switch beacon 500 requires a low power communications device, such as a Bluetooth 4.x receiver, and provides identification and/or location information to an individual locator device 104 when in range of the individual locator device 104. The transmission range of the reed switch device can be user selectable between low, medium and long range.

Specific to the present invention, the reed switch beacons 500 of the personal locator beacon system 100 allow for the implementation of a perimeter security feature which, when enabled, detects "door ajar" events within the perimeter. In accordance with a non-limiting example of implementation, when a reed switch beacon 500 is in a "perimeter mode", a digital output of the reed switch due to opening of the respective door causes the reed switch beacon 500 to change a status register to an alarmed state and/or causes the reed switch beacon 500 to transmit an active beacon signal. At the same time, when the individual locator device 104 is in close proximity to the reed switch beacon 500 on the door, the individual locator device 104 receives the beacon type ID "reed switch beacon", receives the status of the beacon alarmed or receives an active beacon signal. If the door is closed, the reed switch beacon 500 appears as a passive beacon. Therefore, if and only if a change in the state of the door is detected by the reed switch beacon 500, the processor of the individual locator device 104 will transmit an alert status to the location messaging server 106, for forwarding to a caregiver monitoring and/or messaging station 108.

Figure 6:
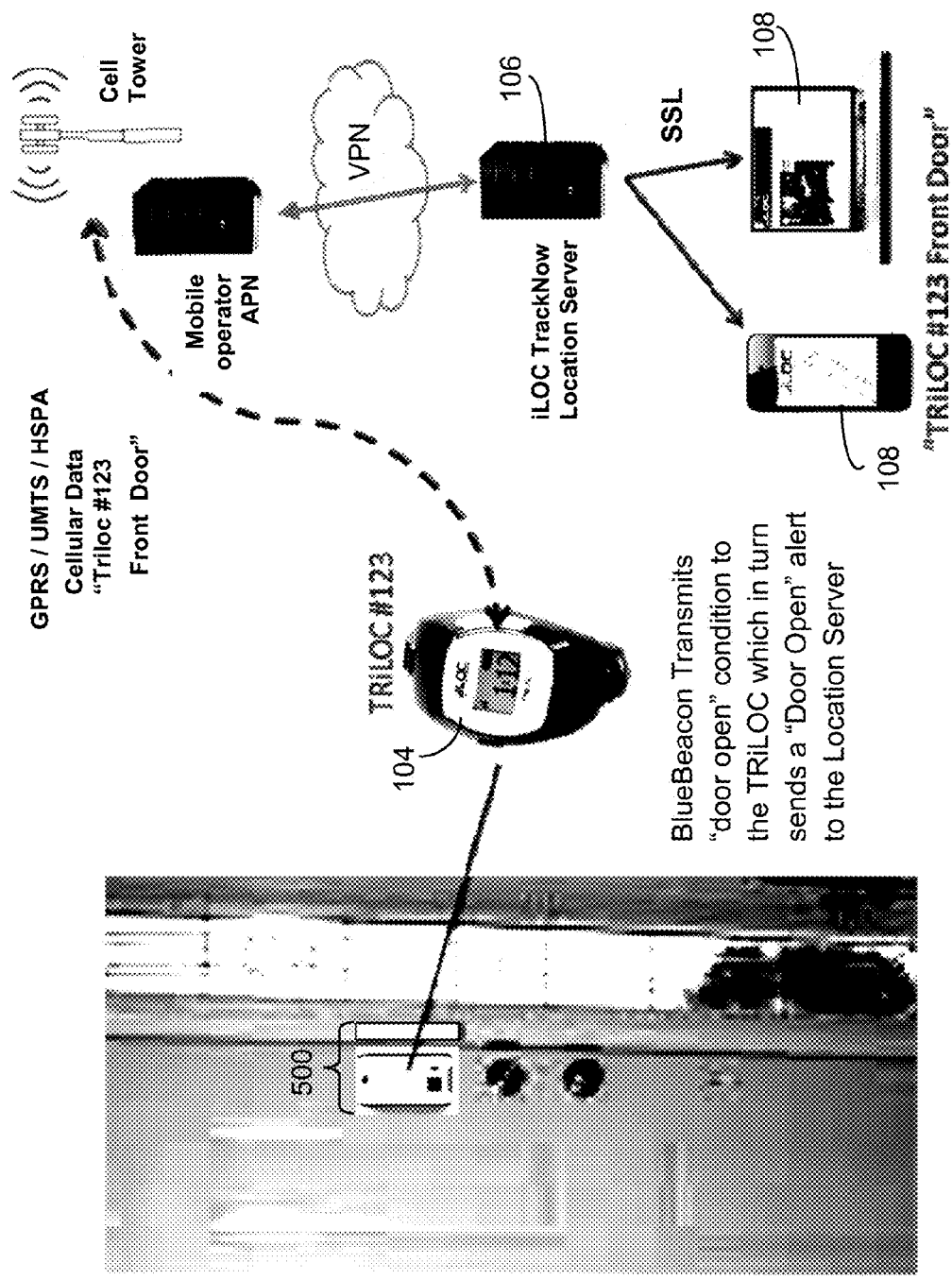
FIG. 6 is a schematic diagram illustrating a perimeter mode of the reed switch beacon device within the personal locator beacon system, in accordance with a non-limiting example of implementation of the present invention.

As shown in the example of FIG. 6, the reed switch beacon 500 in "perimeter mode" will transmit a "door ajar" condition to the individual locator device 104, which in turn will forward a "door ajar" alert event to the location messaging server 106. The server 106 will in turn transmit the alert event to the appropriate caregivers, for example via a monitoring or messaging unit 108 (e.g. by email, by text message, etc.), also providing the caregivers with the relevant location data for the alert condition (e.g. visual or textual geo-location, date and time stamp, name of reed switch beacon 500 at which the "door ajar" condition occurred).

In a variant example of implementation, the individual locator device 104 may read location data from the reed switch beacon 500 broadcasting the "door ajar" condition and transmit this location data to the location messaging server 106 along with the alert event message.

In a variant embodiment of the present invention, a reed switch beacon 500 may include two or more reed switches. In a specific, non-limiting example of implementation, a reed switch beacon 500 includes a pair of reed switches, mounted internally on either side of the beacon and being electrically parallel, in order to simplify installation on a doorway (e.g. left hand side or right hand side). In this case, since the pair of reed switches are electrically parallel, either could detect a "door ajar" event, depending on which side of the doorway the wide-gap magnet is mounted on, and thereafter trigger transmission of the "door ajar" condition to the individual locator device 104 if the beacon is in "perimeter mode".

Figure 9:
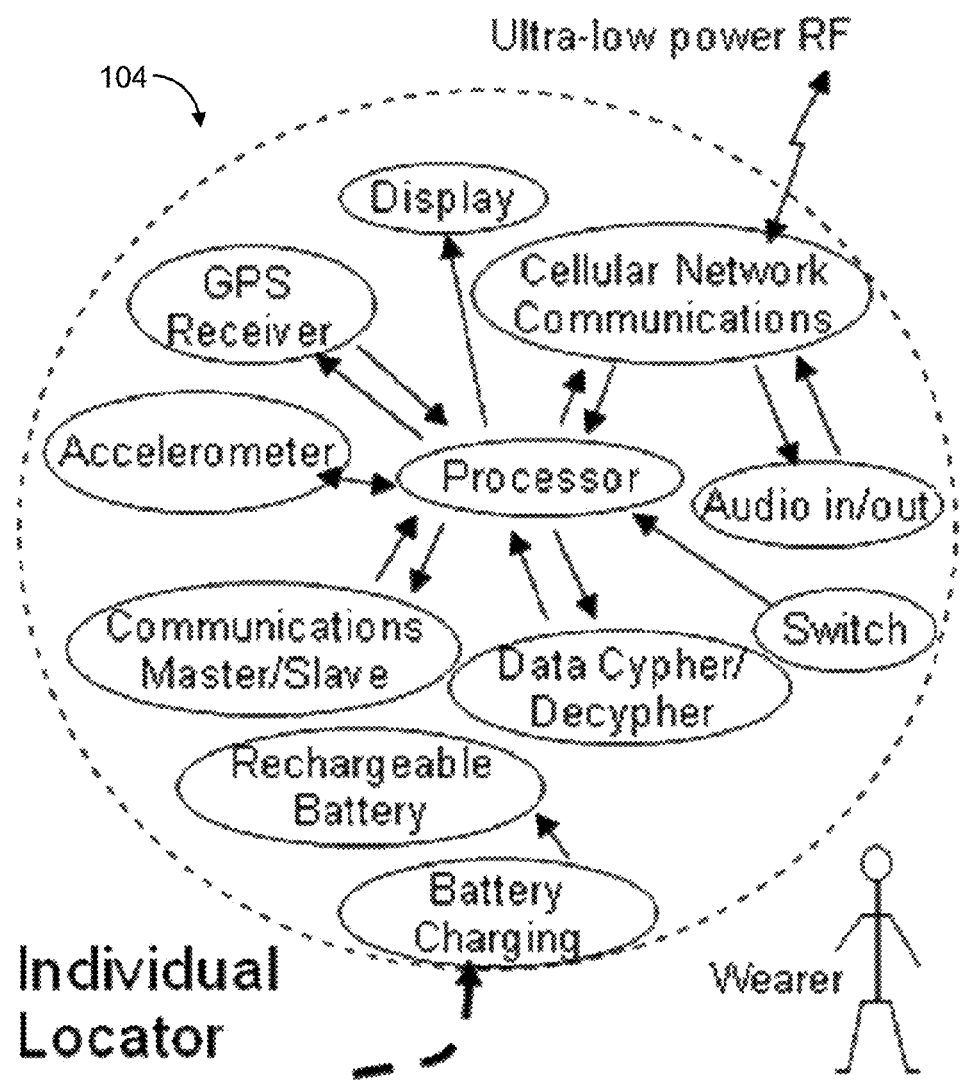
FIG. 9 is a schematic diagram illustrating sample components of an individual locator device, in accordance with a non-limiting example of implementation of the present invention.

In accordance with an embodiment of the proposed solution, the individual locator device 104, for example functionally illustrated in FIG. 9, includes: a housing; rechargeable power storage; optionally persistent data storage for example including programmable non-volatile memory; locator processor executing logic instructions; and preferably individually activateable short range communications receiver (e.g. Bluetooth 4.x) and ultra-low power transmitter (e.g. Bluetooth 4.x), Global Positioning System (GPS) component, and long range communications transceiver component. The primary function of the individual locator 104 is to communicate geo-location and/or alert status to the location messaging server 106, care givers or monitoring services 108.

Figure 7A:
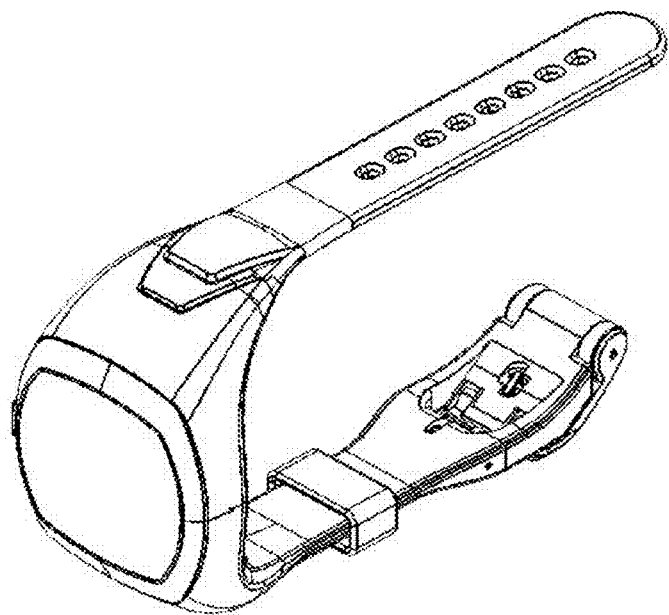
FIGS. 7A and 7B are schematic diagrams illustrating an individual locator device of the personal locator beacon system, in accordance with a non-limiting example of implementation of the present invention.
Figure 7B:
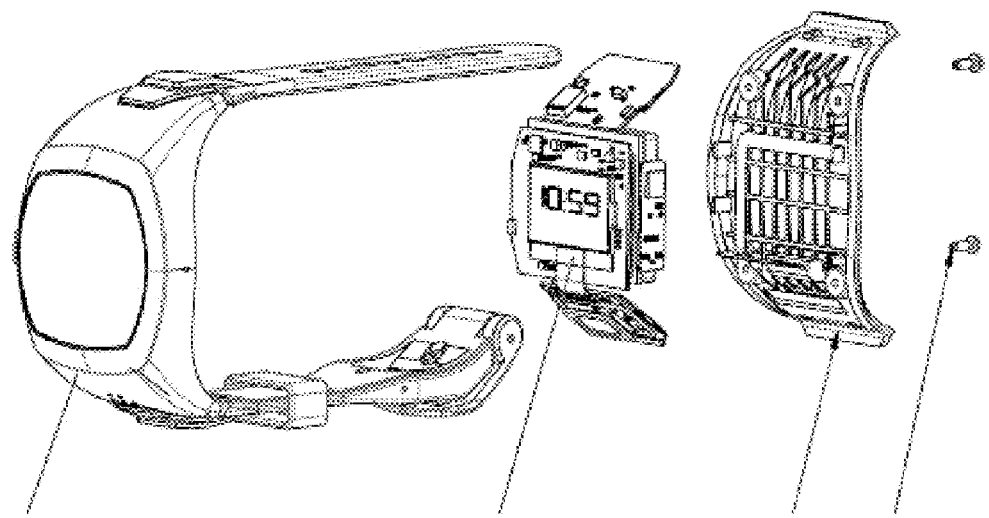

Depending on the particular use scenario in which the individual locator 104 is employed, the housing can have a number of features. Preferably the individual locator is ergonomic, discrete, and waterproof (to 10 ft or 3 m). Preferably the housing has a wristwatch overall appearance as illustrated in FIGS. 7A and 7B, including an adjustable resilient strap (wristband) with a self closable clasp. The invention is not limited to a particular housing, it would be possible to employ a different housing for different applications whilst using the same core components as for the wearable implementation referred to herein.

In accordance with an implementation, being inside the perimeter is determined by the processor of the individual locator 104 for a beacon signal for example by comparing the received signal strength value provided in a RSSI (Received Signal Strength Indicator) specification and a transmission (Tx) power level value provided in a corresponding specification.

No additional wireless network is required for the individual locator device 104 to communicate with the locator messaging server 106, or a monitoring station 108, while the individual locator device 104 is indoors because the location is communicated by the individual locator device 104 via long distance communications, for example via the public cellular network 112 or the satellite communications 110.

For certainty, raising any alarm entails turning on the GPS component and long range communications component of the individual locator device 104 if not already on, establishing communications with the server 106, or a monitoring station 108, providing geolocation information, providing alarm details and preferably sensor readings. In the alarm state due to a sensor out of bounds or due to the individual locator device 104 being outside of the predefined perimeter, the GPS receiver is normally held in a low power mode but able to periodically resolve a GPS coordinate request within 15 seconds every minute for near real-time geolocation reporting and monitoring. Such a fast response can be provided by keeping the GPS in a state from which a hot start can be used.

Figure 10:
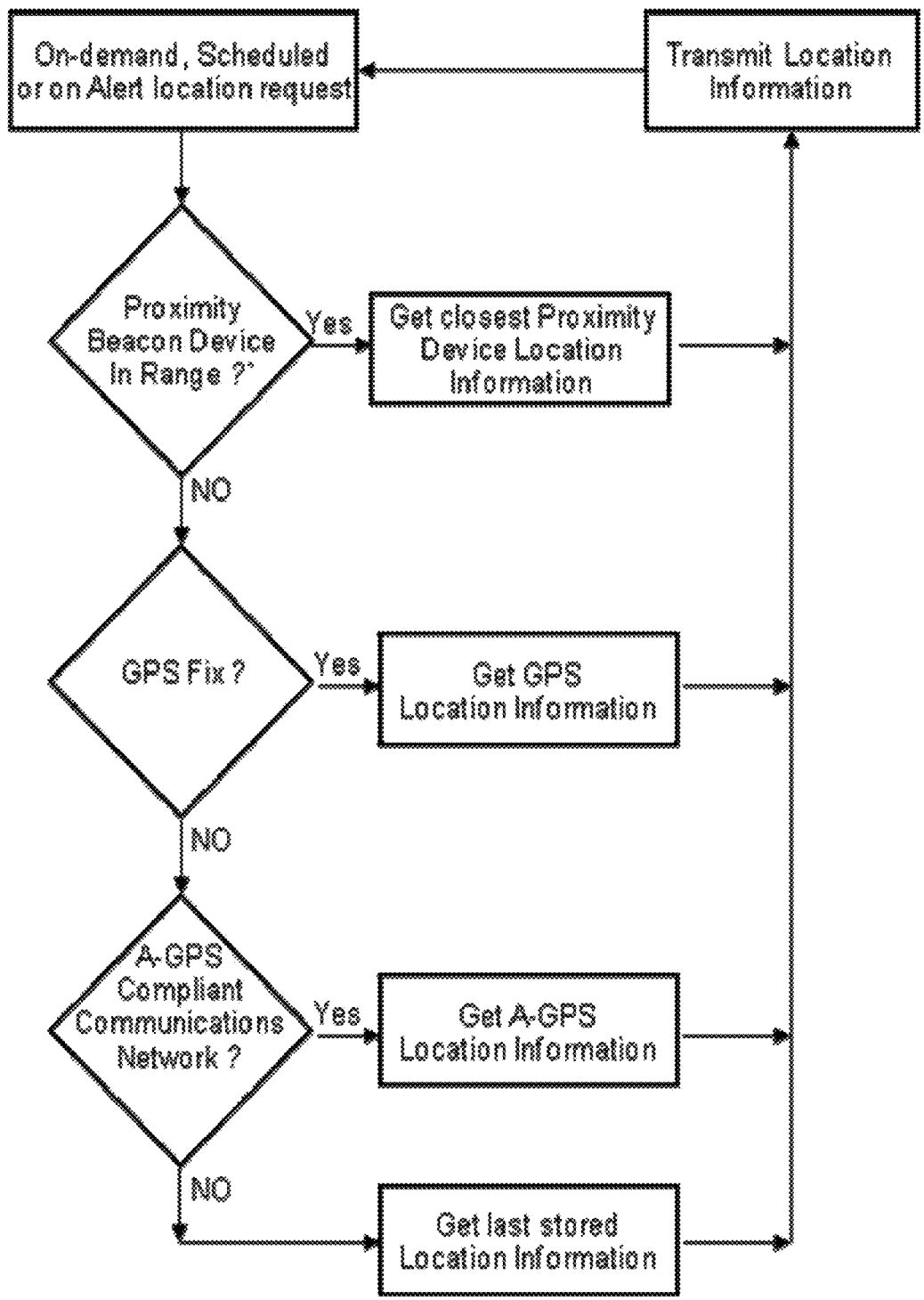
FIG. 10 is a schematic flow diagram illustrating a method for communicating the individual locator device location according to location information availability, in accordance with a non-limiting example of implementation of the present invention.

FIG. 10 illustrates a major operational loop followed by the processor of the individual locator device 104 for checking-in with the location messaging server 106, in accordance with a non-limiting example of implementation of the present invention. The process starts either due to a position request, periodic check-in or due to an alert condition (power status change of multifunction beacon, perimeter violation, sensor out of bound condition). If a beacon 102 is in range, the location of the closest beacon 102 is reported to the server 106. If a beacon signal is not received, the processor checks to see if a GPS fix is available, obtains GPS geolocation through the GPS component and the geolocation is transmitted to the server 106. If a GPS fix is not available, an attempt is made to obtain an A-GPS location through the long distance communications component, such as GSM tower triangulation. If the long distance communications network provides A-GPS, the A-GPS geolocation is obtained and communicated to the server 106. If the long distance communications network does not provide A-GPS, the last-stored location data is communicated to the server 106.

Specific to the present invention, the personal locator beacon system 100 also includes a browser-based Internet website allowing end users and caregivers to view location data and alerts, as well as to set up various modes of operations of the individual locator devices 104 and/or settings or parameters of the beacons 102 themselves.

Figure 12:
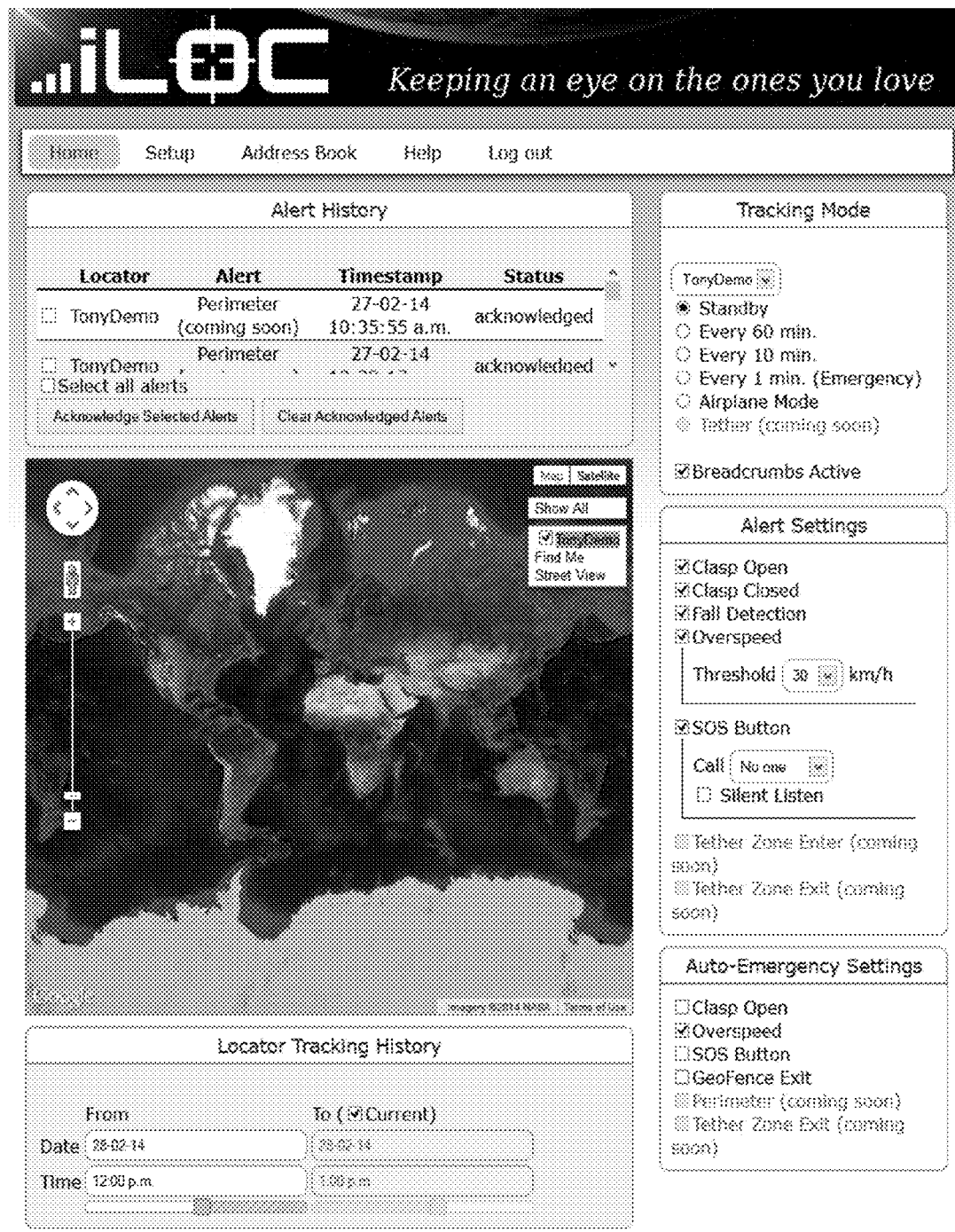
Figure 13:
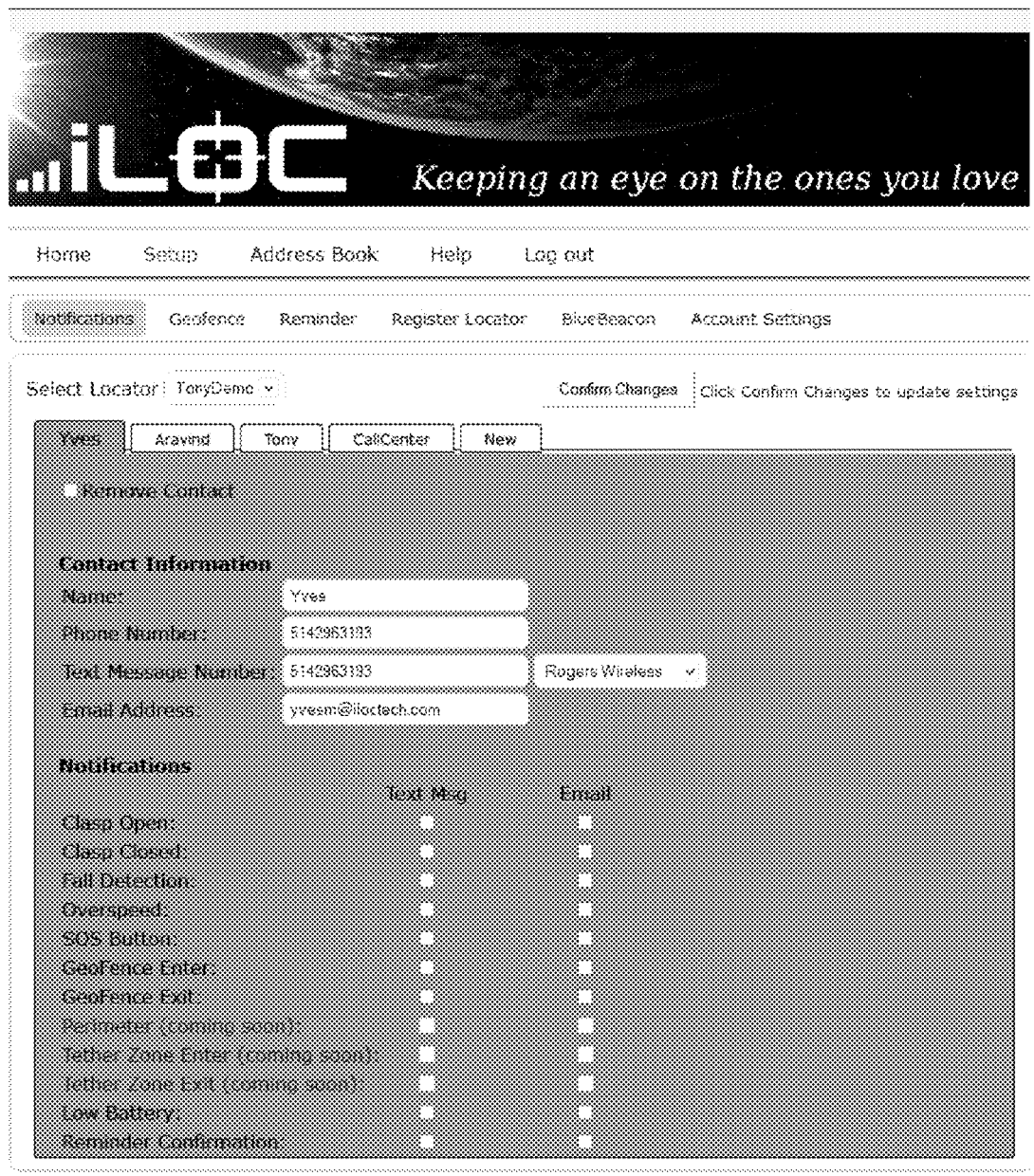
Figure 14:
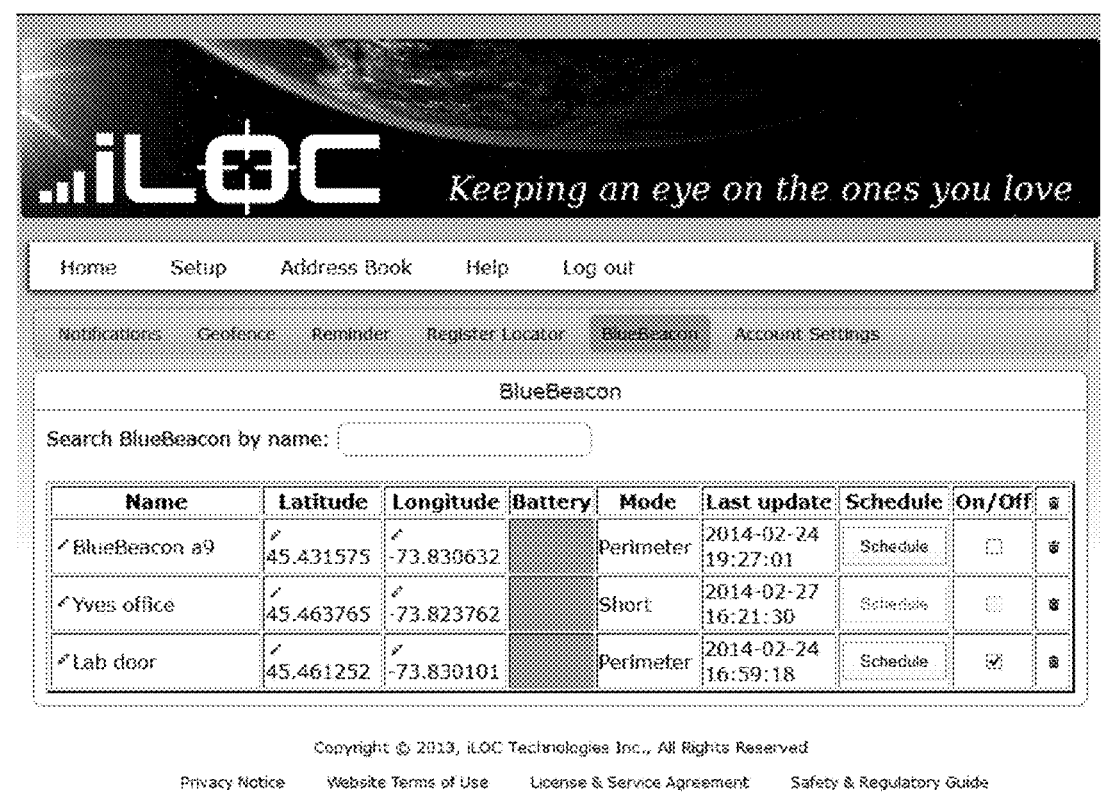
Figures 15A, 15B, 15C:
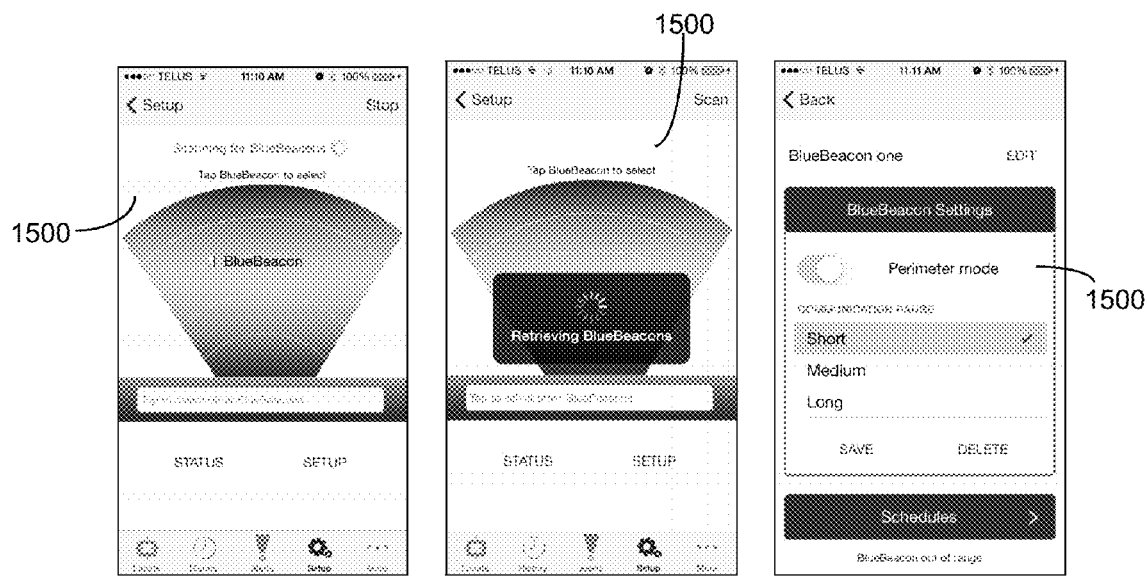
FIGS. 15A-15G illustrate sample viewing windows of the graphical user interface module implemented by a mobile computing apparatus for programming beacon settings, in accordance with an embodiment of the present invention.
Figures 15D, 15E:
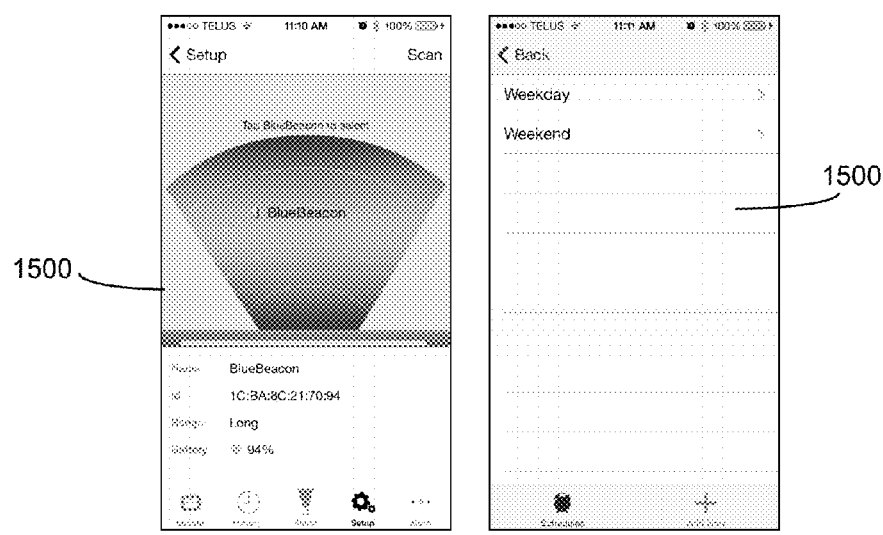
Figure 15F:
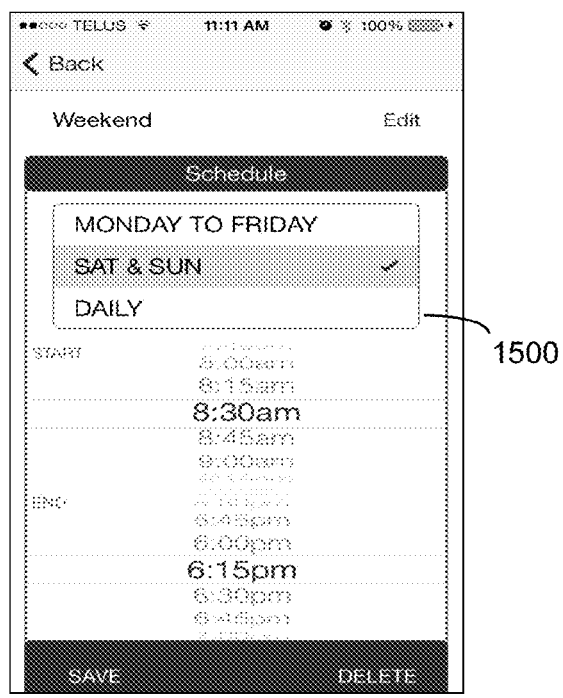
Figure 15G:
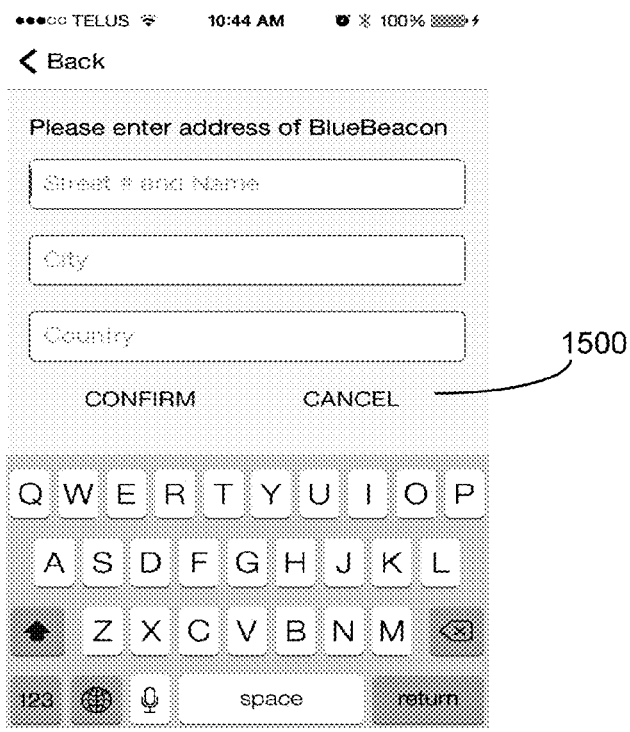

With reference to FIGS. 12, 13 and 14, the website or user portal provides several beacon system tracking, alert, display and notification options, for customization by the authorized users, once these users have successfully undergone authentication and logged into the website. To give but a few possible examples, by logging into the website, an end user or caregiver may: view a map displaying beacons 102 of a facility assigned to the account holder; enable or disable "door ajar" alert; enable or disable an auto-emergency mode when a "door ajar" alert occurs; specify that, on an alert condition, on-demand or according to predefined tracking mode settings, the map display the geo-location of the closest beacon 102 within range of an individual locator device 104 according to the assigned geo-location setup; specify that, when the tracking icon is selected on the map, its text should display the name of the assigned beacon 102, along with the time and date stamp.

Furthermore, in other possible examples, the user portal allows the end user or caregiver to: choose to be notified by email or text message or both of a "door ajar" alert; view beacons 102 assigned to the account holder along with their unique names or ID's; assign latitude & longitude coordinates to the beacons 102; view relative status of battery level for the assigned beacons 102 (for example: green-ok, yellow<20% capacity, red<10% capacity); monitor a functional mode of operation of the beacons 102; view a time/date stamp of last update for each beacon 102; view a user-definable schedule for beacons 102 that are in perimeter mode; and delete a particular beacon 102 from the list of beacons 102 assigned to the account holder.

Many additional and/or different tracking, alert, display, notification or other options are also possible and may be implemented by the user portal for improving the experience and information afforded to the end user or caregiver.

According to another non-limiting embodiment of the present invention, the personal locator beacon system 100 also includes an apparatus implementing a graphical user interface for displaying beacon setup information and allowing a user or caregiver to easily set up the parameters of the beacons 102 of the personal locator beacon system 100 (i.e. program the beacon settings).

This apparatus includes an input for receiving a beacon access signal, a low power communications device (e.g. Bluetooth 4.x receiver/transmitter), a long range communications transceiver, a processing unit coupled to the input and operative to implement a graphical user interface module, as well as an output coupled to the processing unit for releasing a signal for causing a display unit to display the graphical user interface module. The apparatus further includes a user input device, for receiving data from a user of the apparatus (e.g. caregiver). This user input device includes any one or a combination of the following: keyboard, pointing device, touch sensitive surface or speech recognition unit.

In a specific, non-limiting example of implementation, the apparatus is a mobile computing unit or apparatus (e.g. a caregiver smartphone, tablet, mobile computer), in which case the display unit is a component of, and therefore local to, the mobile computing unit and includes a display screen or monitor (e.g. display of the smart phone) to display the graphical user interface.

The processing unit of the mobile computing apparatus runs a software application designed to detect and communicate with a connectable beacon 102 of the personal locator beacon system 100, where such a connectable beacon 102 is within a predefined range of the mobile computing apparatus.

Upon receipt of a beacon access signal from a user, the processing unit is operative to scan (e.g. using Bluetooth 4.x) for connectable beacons 102 within range of the mobile computing apparatus and to implement the graphical user interface module for displaying to the user beacon setup information relative to the detected beacons 102.

FIGS. 15A-15G illustrate a specific, non-limiting example of the graphical user interface module implemented by the processing unit of the computing apparatus, including a plurality of viewing windows 1500. These viewing windows may display: controls representative of connectable beacons detected by the scan, each control allowing a user to select a respective connectable beacon; status information associated with a selected beacon; at least one control allowing a user to set at least one parameter of a selected beacon; a control allowing a user to save set parameters of a selected beacon. Note that these controls, as well as various other types of controls, may be each displayed in separate viewing windows or combined into one or more viewing windows.

The functionality of each control may be provided to the user through buttons, text boxes, drop-down lists or other suitable means on the graphical user interface. When presented with a control in a viewing window 1500 of the graphical user interface, the user may provide information, selections and settings via the user input device of the mobile computing apparatus.

The beacon parameters or settings input by the user via the graphical user interface are wirelessly communicated to the location messaging server 106 for updating the beacon identification and location data stored therein, as well as for reconfiguration of the beacon settings by the server 106. Optionally, these parameters or settings may also be transmitted from the processing unit of the computing apparatus, and directly applied, to the respective beacon 102, via Bluetooth 4.x communications for example.

Those skilled in the art should appreciate that in some embodiments of the invention, all or part of the functionality previously described herein with respect to the apparatus implementing a graphical user interface for displaying beacon setup information may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the apparatus for implementing a graphical user interface for displaying beacon setup information may be implemented as software consisting of a series of instructions for execution by the mobile computing unit (or a remotely connected computing unit). The series of instructions could be stored on a medium which is fixed, tangible and readable directly by the computing unit or the instructions could be stored remotely but transmittable to the computing unit via an interface device (e.g., a communications adapter) connected to a network over a transmission medium. The transmission medium may be either a tangible medium (e.g., optical or analog communications lines) or a medium implemented using wireless techniques.

Figure 16:
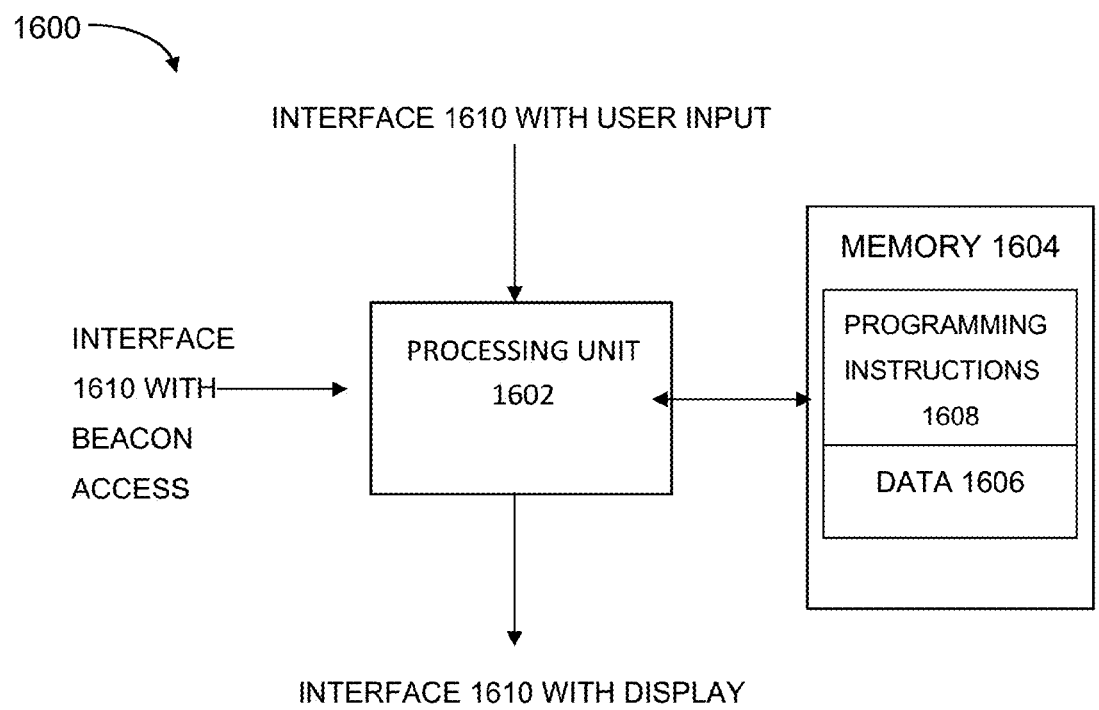
FIG. 16 is a schematic block diagram illustrating functional components of the apparatus implementing a graphical user interface for displaying beacon setup information, in accordance with a non-limiting example of implementation of the present invention.

The apparatus implementing a graphical user interface for displaying beacon setup information may be configured as a computing unit 1600 of the type depicted in FIG. 16, including a processing unit 1602 and a memory 1604 connected by a communication bus. The memory 1604 includes data 1606 and program instructions 1608. The processing unit 1602 is adapted to process the data 1606 and the program instructions 1608 in order to implement the functionality described above. The computing unit 1600 may also comprise a number of interfaces 1610 for receiving or sending data elements to external devices, such as the beacon access signal and control signals from the user.

It will be appreciated that, in a variant embodiment, the graphical user interface for displaying beacon setup information may also be implemented by the aforementioned location messaging server 106, or a separate dedicated server unit. In such a scenario, the server 106 would receive a beacon access signal from a mobile computing unit (e.g. caregiver smartphone) over a network, implement the graphical user interface and then transmit signals back to the mobile computing unit for causing its display unit to display the graphical user interface. The network may be any suitable network including but not limited to a global public network such as the Intranet, a private network and a wireless network.

In a specific, non-limiting example of implementation, the graphical user interface for displaying beacon setup information and allowing a user or caregiver to easily set up the parameters of the beacons 102 of the personal locator beacon system 100 may include: a setup button to access a beacon setup viewing window; a scan button to trigger a scan by range for connectable beacons within range of the apparatus; a control allowing a user to select a particular connectable beacon 102 and displaying one or more viewing windows within which the user can set an ID of the beacon 102, turn ON or OFF a perimeter alert function for the respective beacon 102, as well as set up an operational schedule for the respective beacon 102 (e.g. daily, weekday, weekend, hours of operation); a control allowing the user to set a communication range for a respective beacon 102, for example to one of short, medium, long and perimeter mode, to suit the physical area being covered by the respective beacon 102; a control allowing to capture longitude and latitude coordinates off the computing apparatus and to associate them with a physical location of a respective beacon 102; a control prompting the user to enter an address associated with the location of a respective beacon 102, for submission to a mapping service to acquire geo-location coordinates, which can then be assigned to the respective beacon 102 (useful when the computing apparatus cannot acquire its location coordinates); a control allowing a user to read a status of a particular beacon 102, including one or more of its unique ID, settings (e.g. programmed ID name), range and battery voltage and life indicator; a control allowing the user to save set parameters of a selected beacon 102; a locator button to access a viewing window displaying controls (e.g. icons) indicating the locations of individual locator devices 104 assigned to the account holder; a control allowing the user to view parameters of a particular locator device 104, including for example a locator name, a time and date stamp and the name of the nearest beacon 102 if within range of one or more beacons 102 of the personal locator beacon system 100.

Figure 11:
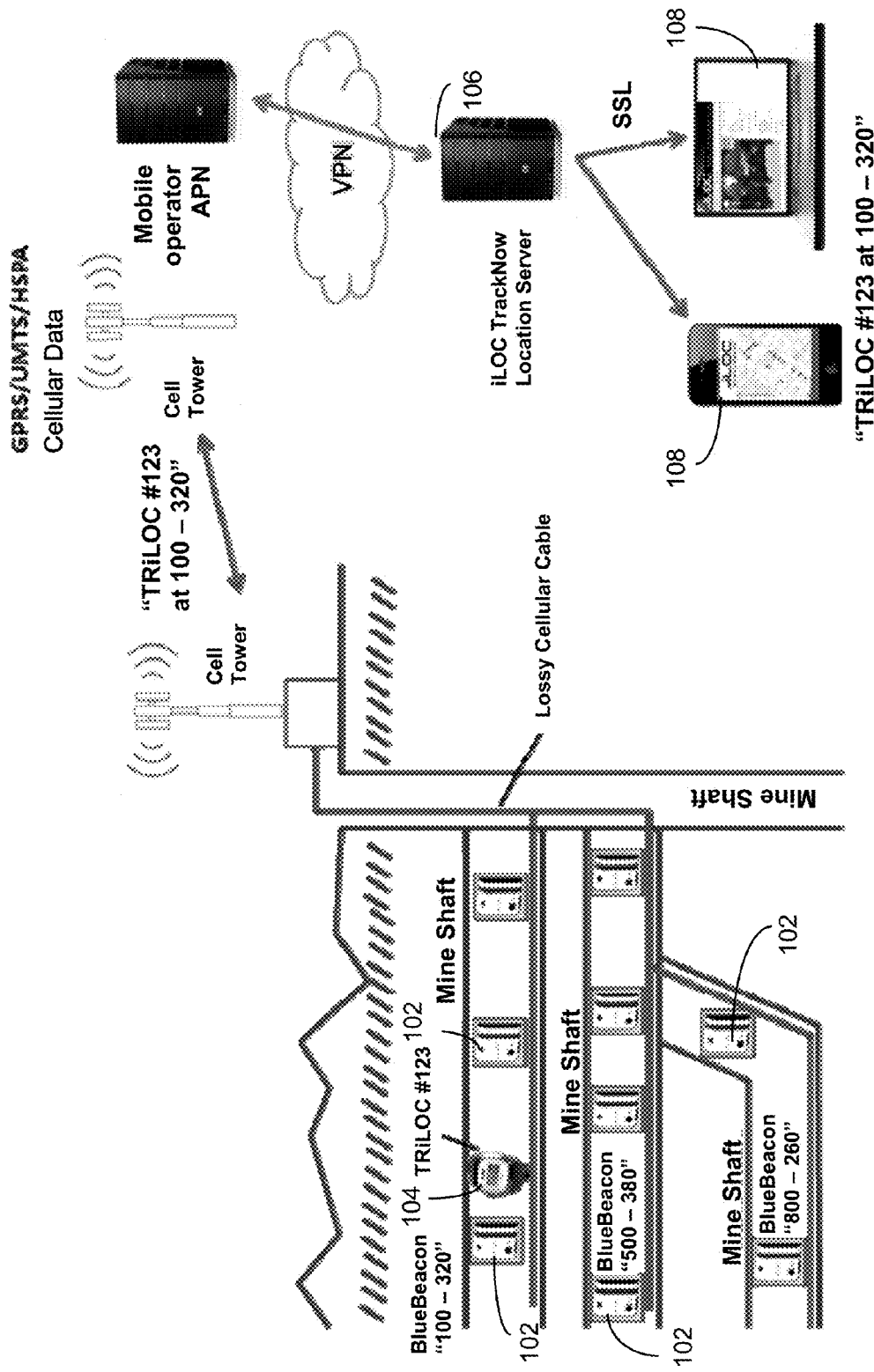
FIG. 11 is a schematic diagram illustrating deployment of the personal locator beacon system in an underground mining environment, in accordance with a variant embodiment of the present invention.

In a variant example of implementation of the personal locator beacon system 100, FIG. 11 illustrates the deployment of such a system 100 in a below-ground mining environment, wherein beacons 102 of various different types (e.g. passive, active, reed-switch, etc.) may be installed at different levels and locations within the mining shaft. Individuals working in the mine can wear respective individual locator devices 104, allowing for these individuals to be tracked and their location within the mine shaft regularly monitored.

In another variant example of implementation of the personal locator beacon system 100, one or more beacons 102 of the system may be affixed to a piece of equipment or other physical object that may have value. In this case, certain beacons 102 of the system are also used to identify an asset and its location. Advantageously, this type of asset tracking would benefit from use of a lower power radio frequency (e.g. Bluetooth 4.x) than typically used in prior art asset tracking methods.

The above-described embodiments and examples of implementation of the present invention have been presented for illustration purposes, but additional variants and modification are possible and should not be excluded from the scope of the present invention.

What is claimed is:

1. A personal locator beacon system comprising:
   a) at least one individual locator device worn by at least one corresponding individual, said locator device having a local wireless transceiver and a GPS receiver;
   b) a plurality of battery powered wireless beacons installed at different locations within a facility, said plurality of beacons including at least a subset of reed switch beacons installed at different doorway locations within the facility, each reed switch beacon configured to:
      i) transmit an identification signal with a predetermined signal strength for reception by said local wireless transceiver of said at least one individual locator device within a designated room or area associated with said facility;
      ii) selectively acquire a perimeter mode for detecting opening of a respective door of the facility;
      iii) if in the perimeter mode, provide an alert signal for reception by a particular individual locator device when said particular individual locator device is in communications range and a status of the respective reed switch is changed.

2. A personal locator beacon system as defined in claim 1, further comprising a remote server receiving alert messages and location data from said at least one individual locator device, said server storing the received location data.

3. A method for displaying beacon setup information on a display of a mobile computing apparatus, said method comprising:
   a) receiving a beacon access signal at the mobile computing apparatus;
   b) scanning by the mobile computing apparatus for connectable beacons within a predefined range;
   c) displaying, in a first viewing window presented on a display screen of the mobile computing apparatus, controls representative of connectable beacons, each control allowing a user to select a respective connectable beacon;
   d) displaying, in a second viewing window presented on the display screen of the mobile computing apparatus, status information associated with a selected beacon;

e) displaying, in a third viewing window presented on the display screen of the mobile computing apparatus, at least one control allowing a user to set at least one parameter of a selected beacon;

f) displaying a control allowing a user to save set parameters of a selected beacon.

4. A computer readable storage medium storing a program element suitable for execution by a CPU, said program element implementing a graphical user interface module for displaying beacon setup information, said graphical user interface module being adapted for displaying as defined in claim 3.

5. A computer readable storage medium as defined in claim 4, wherein said status information includes at least one of an identifier, a setting, a range, a battery voltage and a life indicator.

6. A computer readable storage medium as defined in claim 4, wherein said at least one parameter includes at least one of an identifier, a mode and a schedule.

7. A computer readable storage medium as defined in claim 4, wherein said controls representative of connectable beacons displayed in the first viewing window are selectable icons.

8. An apparatus for implementing a user interface for displaying beacon setup information, said apparatus comprising:
  a) an input for receiving a beacon access signal;
  b) a processing unit coupled to said input, said processing unit being operative to:
    i) scan for connectable beacons within a predefined range of said apparatus;
    ii) implement a graphical user interface module for displaying beacon setup information, said graphical user interface module being adapted for displaying as defined in claim 3;
  c) an output coupled to said processing unit, said output being suitable for releasing a signal for causing a display unit to display said graphical user interface module.

9. A personal locator beacon system comprising:
  a) at least one individual locator device worn by at least one corresponding individual, said locator device having a local wireless transceiver and a GPS receiver;
  b) a plurality of battery powered wireless beacons installed at different locations within a facility, said plurality of beacons including at least a subset of reed switch beacons installed at different doorway locations within the facility, each reed switch beacon configured to:
    i) transmit an identification signal with a predetermined signal strength for reception by said local wireless transceiver of said at least one individual locator within a designated room or area associated with said facility;
    ii) provide at least one of a contact and a digital output signal when at least one particular individual locator is in communications range and a status of the respective reed switch status is changed;
  c) an apparatus for implementing a user interface for displaying beacon setup information, said apparatus comprising:
    i) an input for receiving a beacon access signal;
    ii) a processing unit coupled to said input, said processing unit being operative to:
      (1) scan for connectable beacons within a predefined range of said apparatus;
      (2) implement a graphical user interface module for displaying beacon setup information, said graphical user interface module being adapted for:
        (A) in a first viewing window, displaying controls representative of connectable beacons detected by said scan, each control allowing a user to select a respective connectable beacon;
        (B) in a second viewing window, displaying status information associated with a selected beacon;
        (C) in a third viewing window, displaying at least one control allowing a user to set at least one parameter of a selected beacon;
        (D) displaying a control allowing a user to save set parameters of a selected beacon;
    iii) an output coupled to said processing unit, said output being suitable for releasing a signal for causing a display unit to display the graphical user interface module;
  d) a display unit coupled to the output of said apparatus, said display unit being responsive to the signal to display the graphical user interface module;
  e) a remote server receiving alert messages and location data from said at least one individual locator device, and beacon setup data from said apparatus, said server storing the received location and beacon setup data.

\* \* \* \* \*